(12) United States Patent
Brownell

(10) Patent No.: US 7,788,586 B2
(45) Date of Patent: Aug. 31, 2010

(54) CONTENT OUTPUT QUEUE GENERATION

(75) Inventor: Jason Brownell, San Francisco, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 77 days.

(21) Appl. No.: 11/538,243

(22) Filed: Oct. 3, 2006

(65) Prior Publication Data

US 2007/0083897 A1    Apr. 12, 2007

Related U.S. Application Data

(60) Provisional application No. 60/723,205, filed on Oct. 3, 2005.

(51) Int. Cl.
*G06F 3/16* (2006.01)
(52) U.S. Cl. ...................................... 715/727
(58) Field of Classification Search ........... 707/3
See application file for complete search history.

(56) References Cited

U.S. PATENT DOCUMENTS

| | | | |
|---|---|---|---|
| 6,987,221 | B2 | 1/2006 | Platt et al. |
| 6,993,532 | B1 | 1/2006 | Platt et al. |
| 2002/0103796 | A1* | 8/2002 | Hartley ........................ 707/4 |
| 2003/0229537 | A1 | 12/2003 | Dunning et al. |
| 2004/0017997 | A1* | 1/2004 | Cowgill ...................... 386/65 |
| 2004/0210533 | A1 | 10/2004 | Picker et al. |
| 2005/0240551 | A1 | 10/2005 | Blount et al. |
| 2006/0088292 | A1 | 4/2006 | Guillen et al. |

FOREIGN PATENT DOCUMENTS

WO    WO2005106877    10/2005

OTHER PUBLICATIONS

Jean-Julien Aucouturier, "Scaling Up Music Playlist Generation," Jan. 2004, Sony Computer Science Library.*
Apple Computer, "In tune with your taste", Apple-iTunes-iTunes Jukebox-Playlists, http://www.apple.com/itunes/jukebox/playlists.html, Oct. 2, 2006, 2 pages.
Creative Technology Ltd., "Sound Blaster—Hear to Believe—Music Listening", http://www.soundblaster.com/resources/read.asp?articleid=53834&cat=2&page=1, Oct. 2, 2006, 2 pages.
Gnome.Org, "Rhythmbox—The music management application for GNOME", http://www.gnome.org/projects/rhythmbox/, Oct. 2, 2006, 1 page.
MusicIP.com, "Want More Music?", http://www.musicip.com/, Oct. 2, 2006, 2 pages.

* cited by examiner

*Primary Examiner*—William L Bashore
*Assistant Examiner*—Daniel Um
(74) *Attorney, Agent, or Firm*—John P. O'Banion

(57) ABSTRACT

An automated method and system configured to pseudo-shuffle a pool of electronic content items in accordance with various criteria so that playback of all or a subset of the items in the user's collection occur in a pseudo-random order. The shuffled content items may be output to a user or transferred to a device. A list of the shuffled content items is built and may be saved for later use for playback on a PC or portable device. In some instances the list is built without output or download of the content items.

3 Claims, 6 Drawing Sheets

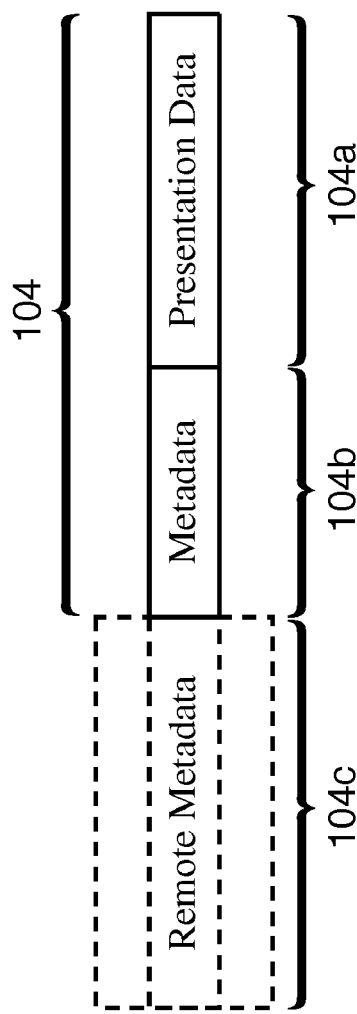
FIG. 2
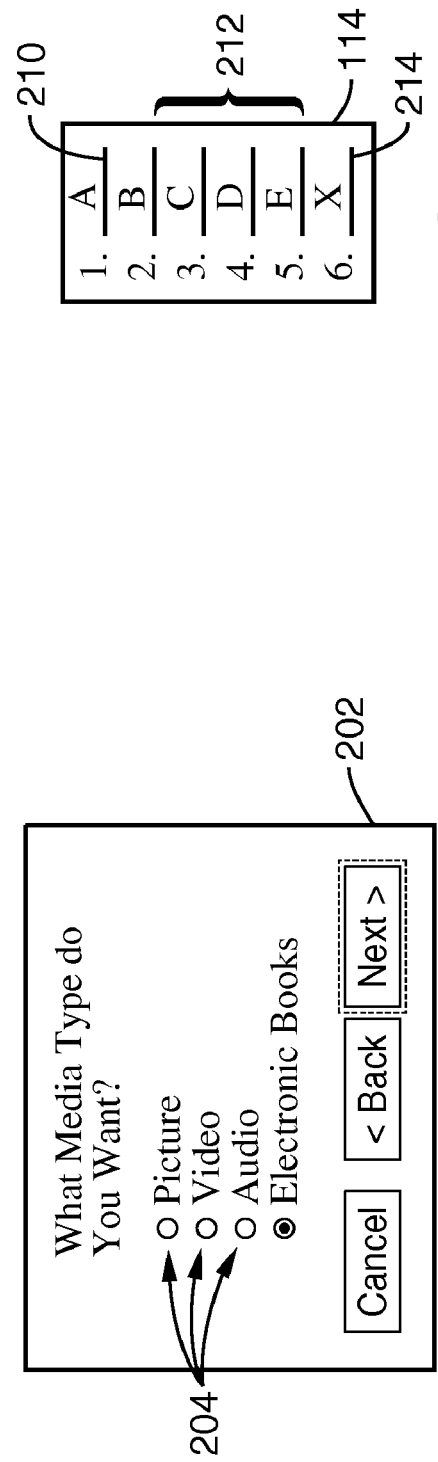
FIG. 4
FIG. 3

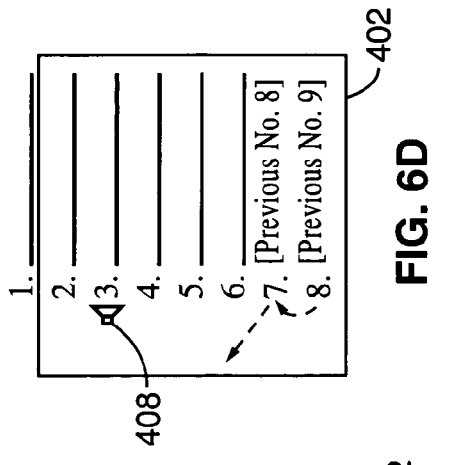
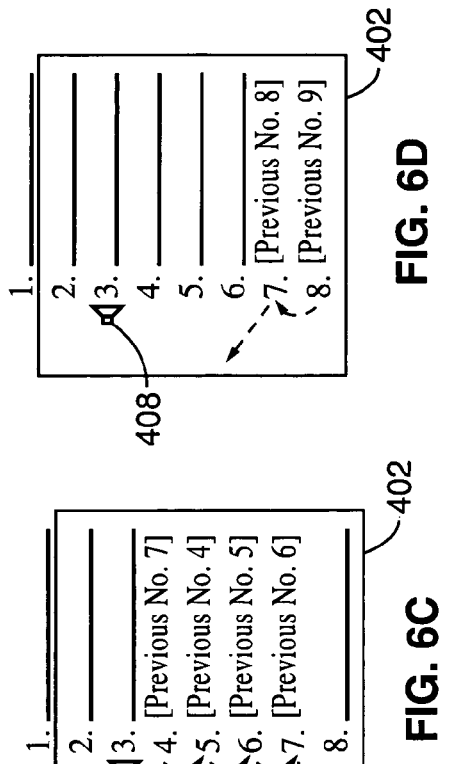
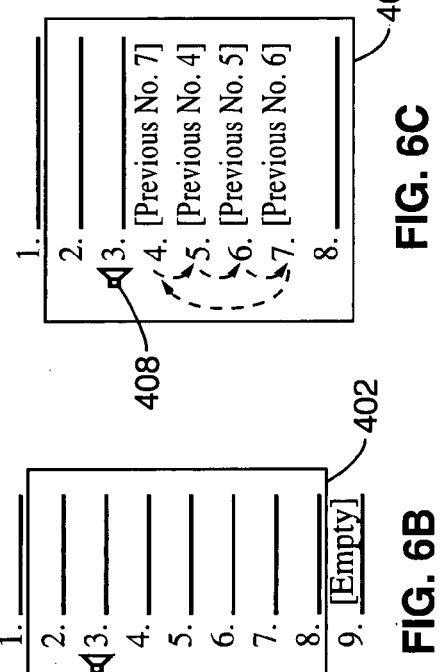
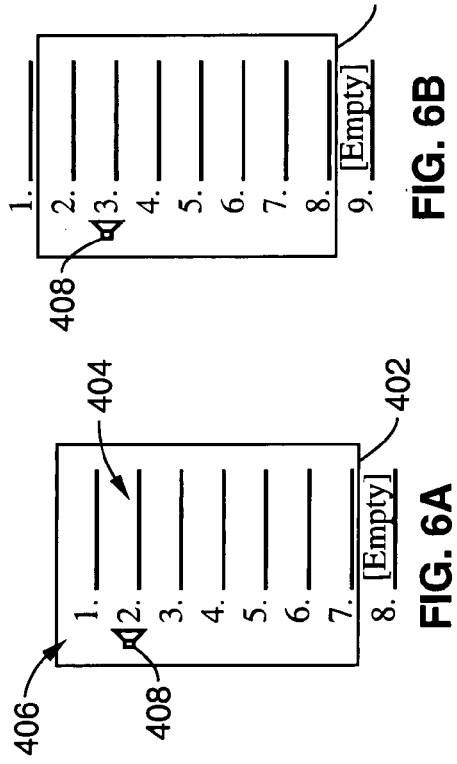
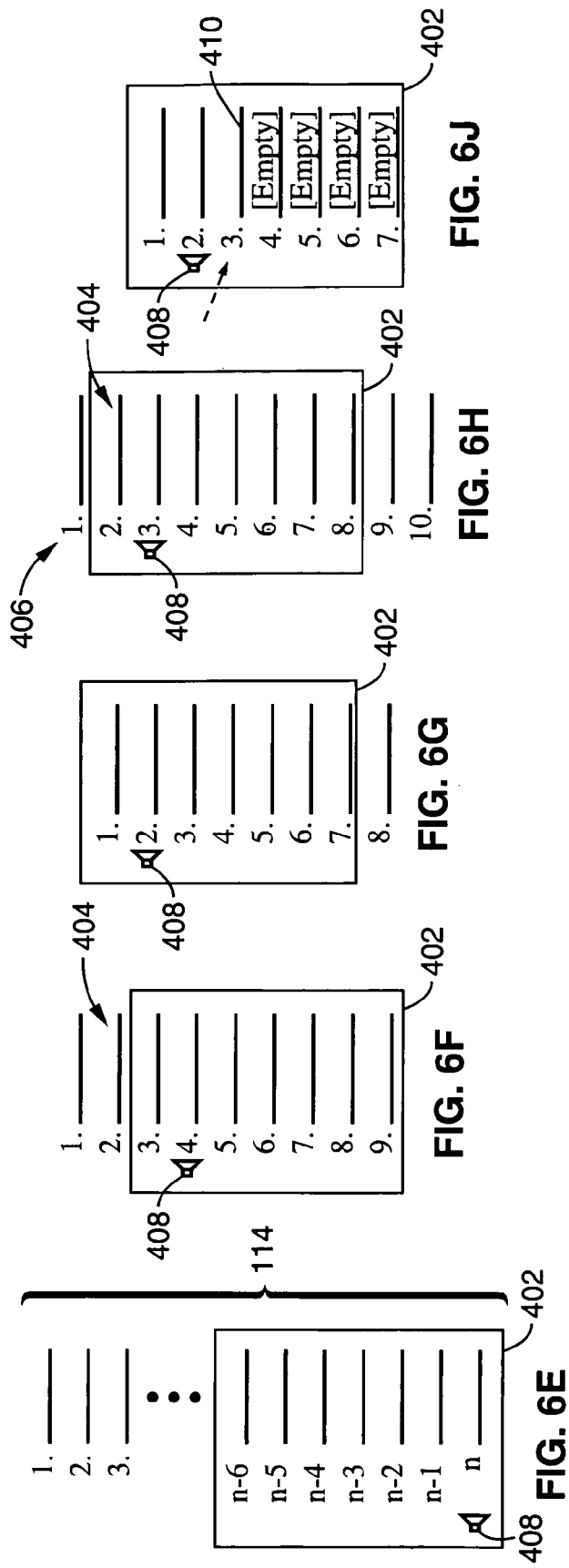

CONTENT OUTPUT QUEUE GENERATION

CROSS-REFERENCE TO RELATED APPLICATIONS

This application claims priority from U.S. provisional application Ser. No. 60/723,205 filed on Oct. 3, 2005, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to automatically arranging electronic content items, and more particularly to arranging such content items in a queue for output or download.

2. Description of Related Art

Various techniques exist that allow a user to automatically output electronic content stored in a library of electronic content items. One technique is to output items from the library in the order in which they are stored. Another technique is to manually manipulate the order in which content items are stored in the library, and then output the content items in the new order in which they are stored. Yet another technique includes randomly selecting and outputting one item from the library, randomly selecting and outputting a second item from the library, and so on.

BRIEF SUMMARY OF THE INVENTION

An automated system is disclosed that is configured to "shuffle" a pool of electronic content items in accordance with various criteria. The shuffled content items may be output to a user (the process acts as an automated or "robotic" disk jockey) or transferred to a device. A list of the shuffled content items is built and saved for later use. In some instances the list is built without output or download of the content items.

The instant invention includes a method and system for providing a "smart-shuffle" or "pseudo-shuffle," that allows playback of all or a subset of the items in the user's collection to occur in a pseudo-random order. A list, having a "smart" selection of content, may be generated for playback on a PC or portable device.

The system may be configured such that content items that are rated more highly or that have been played more often appear more frequently or earlier in the generated list, and items that are less highly rated or played infrequently appear later or less frequently in the list. Output of the generated list may be configured so that only a few items at a time would initially appear in the play queue, with a "look ahead" list of items that have not yet played. Removing items from the list would cause new items to come into the list to replace them. Items can be played more than once if wanted (preference). There is theoretically no end to the queue length, but parameters may be set to play through the entire library before starting over the full library shuffle.

At its most basic, the library shuffle of the present invention is the ability to randomly play the contents of the entire library or a subset of the library, in some unpredictable, but guided, order, while taking into account additional user variables like ratings, rotations, repeats, play counts genres, etc. The library shuffle of the present invention is configured to generate pseudo random playback or navigation through compressed or uncompressed audio files (e.g. CD audio tracks), picture files, video files, networked content (from another drive, PC, service, etc.), or compilations of any of the above, while maintaining a fully navigational forward or backward advancement of output content item in the play history.

The system and methods of the present invention allow taking user ratings, item plays, repeat settings, and so forth into account for weighting the order of playing items.

In one aspect a library of content items may be first filtered to make a smaller content pool. The items in the content pool may then be randomly selected and evaluated in accordance with one or more criteria (i.e. a "smart" shuffle). The selected content items are placed in the output queue or are downloaded to a device, or a list of the selected content items is saved. In some embodiments the criteria include weighting factors associated with each content item so that content items with particular weights will tend to appear at various positions in the output queue or saved list. Since the process begins with a random selection of a content item from the content pool, different output queue orders are generated using the same items from the content pool. Thus, if a user chooses to have a continuous output of the content items in the content pool, the content items will first be output in one order until all have been output, and then the content items will be output in a different order. A user may manipulate the output queue or the list to add, delete, or rearrange one or more particular content items, and the user may save the manipulated queue or list.

Thus, one or more groups of desired content items are filtered from a large library of content items and placed into a pool, and then the content items in the pool are automatically output in a unique, non-repeating manner pleasing to a user.

An aspect of the invention is a method for generating a list of content items for playback. The method comprises the steps of accessing a library having a plurality of library content items, and selecting a plurality of playback content items from the library to generate a pseudo-random list of content items for playback, wherein selection of library content items is manipulated to control the generated list of playback content items by evaluating one or more characteristics of the library content items according to one or more predetermined selection criteria.

The library content items may comprise any number or combination of sound (e.g., music), video, picture, or similar files, such as MP3, OGG, WMA, AAC, WAV, MPG, MOV, AVI GIF, and TIFF files. The evaluated characteristics may be any type of data associated with the file, and may vary according to file type. Exemplary characteristics include, but are not limited to characteristics comprising one or more of the following: filename, song or album title, genre, size, type, duration, last played, play count, date created, composer, bitrate, beats per minute (BPM), season, episode number, show, and the like.

In one embodiment, the list comprises an output queue for playback of the selected playback content items on a platform used to generate the list. Alternatively, or in combination, the list may be configured for output to an external device for playback, such as a portable media player.

In another embodiment, each of the library content items comprises presentation data for playback, and metadata associated with the presentation data, wherein the metadata comprises the characteristics for selection.

In yet another embodiment, the library content items may be filtered into a content pool prior to being selected so that the playback content items are selected from the content pool to generate the pseudo-random list. The library content items may be filtered to generate the content pool according to the one or more characteristics. Preferably, the characteristics and selection criteria are selectable by a user.

In one mode, selecting a plurality of playback content items further comprises randomly selecting a first content item from the library, evaluating one or more characteristics of the first content item against one or more predetermined criteria, and placing the first content item in the list if the one or more criteria are met.

In one embodiment, selecting a plurality of playback content items includes the steps of randomly selecting a second content item from the library, comparing the first content item to the second content item according to the one or more predetermined criteria, and including or excluding the second content item at a location in the list if the one or more predetermined criteria are met. The second content item may be temporarily excluded from one or more locations in the list to maintain a minimum queue distance between the first content item and the second content item, wherein the temporary exclusion is a function of the predetermined criteria. Alternatively, the second content item may be excluded from all remaining locations in the list based on the predetermined criteria. The second content item may also be placed in the list at a location sequential with the first content item.

In yet another embodiment, the playback content items are selected to generate a list having one or more clusters of content items, the clusters having a specified probability of having a characteristic matching one or more specified criteria.

Another aspect is a method for generating a list of content items for playback. The method includes the steps of providing a library having a plurality of library content items, randomly selecting a set of content items from the plurality of library content items, evaluating one or more characteristics of each of the content items in the set against one or more predetermined criteria, and generating a list of playback content items having at least one characteristic matching at least one of the predetermined criteria, wherein the generated list is configured to provide a sequential order for playback of the content items. The list may comprise an output queue for playback of the selected playback content items on a platform used to generated the list, or be configured for output to an external device for playback.

In one embodiment, characteristics are stored as metadata associated with each of the library content items. The library may be stored on a platform used to generate the list, or at a remote location.

In another embodiment, the step of evaluating one or more characteristics of the selected content items includes: evaluating one or more characteristics of the first content item against one or more predetermined criteria; placing the first content item in said list if the one or more criteria are met; comparing a second content item to the first content item according to the one or more predetermined criteria; and including or excluding the second content item at a location in the list if the one or more predetermined criteria are met.

In another embodiment, a characteristic comprises a rating value associated with each content item, such that a content item is excluded or included at a location on the list based on the rating value exceeding a predetermined threshold. The predetermined criteria may be used to control the probability that a library content item having a particular rating value is included in the list. The rating value may be explicitly applied to each content item by a user, or implicitly applied to each content item based on the frequency that each content item is selected for playback by a user.

Another aspect is a method comprising; providing a library having a plurality of library content items; accessing first data associated with one or more content items in the library; selecting a plurality of playback content items for which the accessed first data meets a selection criterion; and storing second data associated with each selected playback content item, wherein the stored second data comprises a list of selected songs. The stored second data is stored as a content output queue for playback.

The method may further comprise generating a pool of content items by applying one or more filtering criteria to the library, wherein the plurality of playback content items are selected from the pool.

In one embodiment of the current aspect, playback content items are randomly selected against the selection criterion to generate a pseudo-random list.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 2 is a diagram illustrating an electronic content item.

FIG. 3 illustrates a user interface for selecting a media type.

FIG. 4 is illustrates a display window outputting a list of content items having a soft exclusion.

FIGS. 6A-6H and 6J illustrate display views for output queue generation in accordance with the present invention.

DETAILED DESCRIPTION OF THE INVENTION

Referring more specifically to the drawings, for illustrative purposes the present invention is embodied in the apparatus generally shown in FIG. 1 through FIG. 7B. It will be appreciated that the apparatus may vary as to configuration and as to details of the parts, and that the method may vary as to the specific steps and sequence, without departing from the basic concepts as disclosed herein.

Well-known and understood features and functions (e.g., those of typical computing platforms, electronic data networks, etc.) are omitted from this description so as more clearly describe the various illustrative embodiments. Coding is routine in view of this disclosure. In one embodiment, coding is done using C++ with C, XML, and ECMAScript (FSK by KINOMA, INC., Palo Alto, Calif.).

Figure 1:
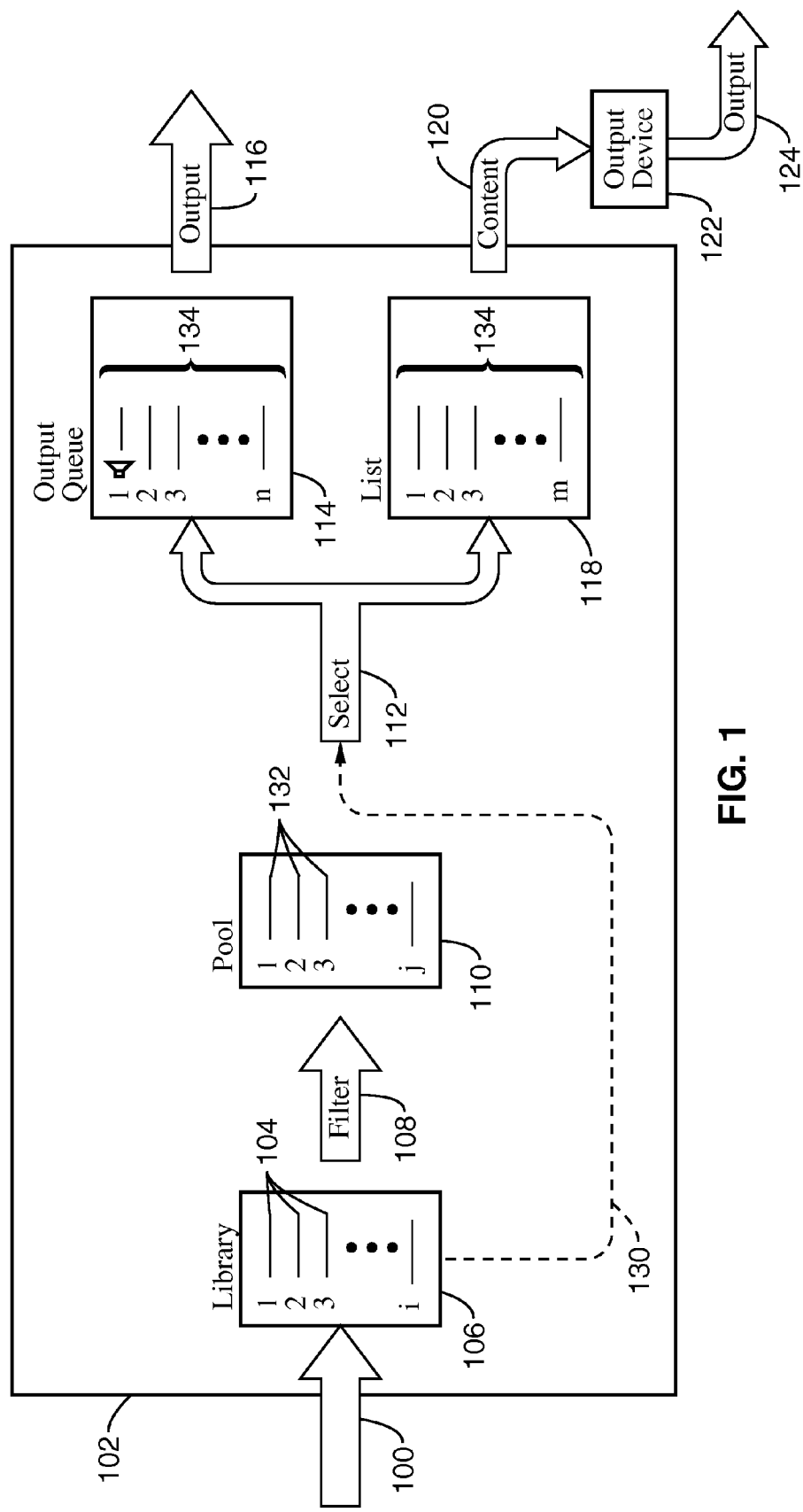
FIG. 1 is a diagram illustrating the content selection process of the present invention.

FIG. 1 is a diagrammatic view of a content filtering and arrangement process of the present invention, as carried out by a conventional electronic data processing platform 102 (e.g., desk top/portable personal computer using X86-architecture microprocessor, or playback device such as an MP3 player, viewer or other media player).

In one embodiment, the invention may include part of a content output client (e.g., CONNECT PLAYER by SONY CORPORATION) executed by data processing platform 102. Various single- and multi-media electronic library content items 104 (e.g., audio data such as music or audio book readings, video data, audio/video data such as music videos or movies, text, graphics, electronic books, and so forth) may be stored or coupled to a data processing platform 102. The files may be uncompressed or compressed files that require a codec for compression, decompression and playback. Exemplary file formats may include but are not limited to those commonly used in the art, such as MP3, OGG, WMA, AAC, WAV, MPG, MOV, AVI, GIF, TIFF, and similar formats.

In some embodiments, content items 104 may be transferred (including down-, up-, or side-loading, or streaming) via interface 100 (e.g. communication port such as an Ethernet connection, USB port, serial port, etc.) for access by the platform 102. When used as a part of a content output client (e.g., CONNECT PLAYER by SONY CORPORATION) library content items 104 may be transferred from an electronic content providing source (not shown; e.g., a remote server system such as the CONNECT MUSIC STORE operated by SONY CORPORATION; a peer data processing platform) via interface 100 and a network interconnection (e.g., an interconnection to the Internet network of interconnected networks; a peer-to-peer interconnection) to memory (not shown) in or coupled to platform 102.

FIG. 2 is a diagrammatic view of an illustrative electronic content item 104 (e.g., illustrative container format) that includes presentation data 104a and metadata 104b. In some instances metadata 104b and presentation data 104a (essence; although the data need not be encoded) are stored at the same electronic storage location (e.g. on a hard drive coupled to the platform 102). In other instances, some or all metadata 104b is stored at a location (e.g., a server accessed via a network) different from the electronic storage location at which presentation data 104a is stored, in which case remotely stored metadata 104c is accessed via a communications link so as to perform actions described below.

The various transferred content items 104, stored as a whole on, or coupled to, platform 102, are grouped as content library 106. Each content item typically includes both data used to make an output presentation to a user (e.g., digitized audio data used to reconstruct music) and metadata associated with the output presentation data (e.g., filename, song or album title, genre, size, type, duration, last played, play count, date created, date modified, composer, bit rate, beats per minute (BPM), season, episode number, show. etc.).

In some instances, the content items in content library 106 are not stored in a single storage device. Content library 106 may, for example, be stored in two or more different memory types (e.g., flash EEPROM and hard disk) at platform 102 or may be distributed among two or more data processing platforms. Content items in such a distributed content library 106 may be accessed via network or peripheral connections, and such content items may be from different content sources (e.g., different content providing services).

In one embodiment, a filtering process 108 may optionally be employed (described in further detail below) to pre-select particular content items 104 from library 106, thereby placing the selected content items in content pool 110. Filtering process 108 allows the user to specify a subset of the content items in library 106 from which to construct an output queue. This filtering feature may be used, for example, if a large number (e.g., thousands) of content items are stored in library 106, or if various different content item types (e.g., audio only, audio/video) are stored in content library 106. In some instances filtering 108 and pool 110 are not used, and selection process 112 operates directly on library 106 (illustrated in FIG. 1 as line 130).

Selection process 112, described in detail below, is then used to arrange filtered content items 132 in pool 110 to generate a content output queue 114, e.g., a "playlist", (the term "playlist" is herein defined to mean an output of any type of content item, including output of two or more different types of content items) having a set or plurality of playback content items 134. Since a random selection process is generally associated with this arrangement in some way, the arranging can be considered a "shuffle" of the content pool 110 "deck". This shuffling, as described herein in its various embodiments, can in one embodiment be selected or unselected by a user.

The presentation data in playback content items 134 of output queue 114 are then output 116. Output 116 of the data from output queue 114 may vary depending on the particular device configuration of platform 102 (e.g. personal computer, media player, etc.). The output 116 data may be processed for playback (e.g. audio data output having an MP3 format output may be decoded (decompression) with a decoding software for playback via a speaker, with the output queue 114 list of content items content items being sent to the display for viewing/selection/manipulation by the user (e.g., content data consumer, listener, viewer). Likewise, video data may be output via a display and speaker that are coupled to the platform.

Selection process 112 is also used to arrange content items in pool 110 (or directly from library 106) into list 118 of playback content items 134 to be transferred (up-, down-, or side-loaded, or streamed) from platform 102. Playback content items 134 listed on list 118 may be output via port 120 (e.g., by direct interconnection using IEEE 1394 protocol, by transfer via flash memory card, etc.) to an external device 122 (e.g., to a content library in a portable media/content player, such as a WALKMAN or in a SONY PSP portable game platform, etc.), or to another platform for remote storage or playback.

The presentation data of the transferred content items 134 may then be output 124 via output device 122 to the user in a similar fashion to output 116. In some embodiments, the external device 122 outputs content item presentation data using output queue generation logic substantially similar in whole or in part to that described in this description (i.e., device 122 performs another selection process 112 to build an output queue similar to output queue 114). In other instances, external device 122 may output content item presentation data in accordance with other well-known output processes (e.g., output in the library order, output using "random" (pseudo-random electronic data processing techniques) content shuffling, receives one or more output queues 114 from platform 102 and uses a received output queue 114 as a playlist, uses a separately generated playlist, etc.).

In some instances, output queue 114 is saved and is used as a playlist for content output from, e.g., platform 102 or output device 122. In some instances, two or more different output queues 114 are saved and the user selections one output queue 114 to use as a playlist.

As outlined above, filtering process 108 may be used to select content items from library 106 for selection in content pool 110. This filtering is done using one or more various parameters associated with the content items in library 106. For example, filtering process 108 may be used to place only content of a particular type, such as music audio works (e.g., songs) or music videos, into content pool 110. In another instance, filtering process 108 allows the user to further select content items by choosing other parameters such as music genre (e.g., music classified as tango music or as rock and roll music), artist, exact number of content items to be placed in content pool 110, container format (e.g., files encoded in accordance with ISOIIEC 11172-3 Layer 3 (MPEG-1 Audio Layer 3, popularly known as "MP3")), content creation date, content purchase date, content transfer date (e.g., date transferred to platform 102; recently transferred content may be of particular interest to a user), content duration, date last played (e.g., a user may be particularly interested in songs recently played or in songs not recently played), etc.

In some embodiments, the user may be prompted to make selections for filtering process 108 with a Wizard-type interface of a step-by-step set of interactive dialogs. FIG. 3 is a diagrammatic view of an illustrative wizard interface dialog box 202 with radio buttons 204, used during filtering process 108. Once content pool 110 is built, the user may be restricted from editing content pool 110, but can view a list of content items in content pool 110. In some embodiments, a list of the parameters used during filtering process 108 may be viewable by the user so as to recall the general nature of the content items in content pool 110. In some embodiments, the user can edit the parameters used during filtering process 108 so as to use a somewhat different filtering process 108 to create another content pool 110.

In some embodiments, one or more other content item filtering applications may also be available to build content pool 110 from content items in content library 106. In one instance, for example, an application using technology from GRACENOTE, INC. (Emeryville, Calif.) may be used as filter 108 (e.g., by music genre) to create a playlist that functions as a source or content pool 110. In another instance, for example, an application using mix technology from MOODLOGIC, INC. (San Francisco, Calif.) is used as a filter 108 to create a playlist that functions as content pool 110.

Output queue 114 may be constructed in several ways: (a) automatically using one or more preset build criteria, (b) automatically using one or more preset build criteria and one or more user specified build criteria, and (c) manual editing of a list built using (a) or (b). As outlined above and discussed in detail below, this construction is done using selection process 112. Once content pool 110 is built, each filtered content item 132 in content pool 110 becomes a candidate to be selected for output queue 114 or list 118. The description below concentrates on selection process 112 building output queue 114, although list 118 is generally built using similar processes. Building output queue 114 is generally associated with presentation data being output as output queue 114 is constructed (the build process places a small number of content items in the output queue following the content item presently being output to the user), whereas building list 118 generally just builds the list. In one instance, however, content items are transferred 120 as list 118 is built. Either output queue 114 or list 118 can be saved and/or output to later function as an output or transfer queue.

In one embodiment, output queue 114 may simply duplicate content pool 110 so that each content item in content pool 110 is output 116 in the order it appears in content pool 110 (selection process 112 is disabled).

In another embodiment, output queue 114 is automatically built so that the presentation data of content items in content pool 110 is output in an unpredictable (random) order that varies each time selection process 112 is performed. For example, the first content item in output queue 114 may randomly be selected from all content items in content pool 110. The second content item in output queue 114 is randomly selected from the remaining non-selected content items in content pool 110. The selection continues until all content items in content pool have been placed in output queue 114. The user may, however, choose to allow items in content pool 110 be selected more than once.

After all content items in content pool 114 have been placed into output queue 114; selection process 112 begins again to build another unique output queue 114 from the content items in content pool 110. Any of such output queues 114 can be saved. The continuous building of output queues 114 and associated output of queued content item presentation data provides a continuous output (continuous play) of data to the user.

In yet another embodiment, the automatic random selection of content items is modified. For example, the first content item in output queue 114 may randomly selected from all content items in content pool 110. A second content item is randomly selected from the remaining non-selected content items in content pool 110. Information associated with the second content item may then be automatically compared with information associated with the first content item. The selected second content item is placed in output queue 114 (or prevented from being placed in output queue 114) if the comparison has a specific result. The parameters or criteria for comparison may be any number of characteristics set by the user. For example, the comparison may be used to prevent two content items by the same artist from being placed consecutively in output queue 114. Alternatively, the user may specify that that a set number of songs (e.g. two, three, four, etc.) of the same artist be placed consecutively in the output queue 114 (e.g. grouping songs by the same artist).

In another embodiment, comparison parameters may be changed so that two content items from the same album (or genre, disc, or other content item grouping) are prevented from or specified to be placed consecutively in output queue 114.

The selection process 112 may also be configured so that the user may choose to have the content items in content pool automatically selected/ordered in accordance with various parameter settings that the user selects. For example, the user may establish one or more evaluation parameters (if not using default settings) to be applied to the content pool (e.g. randomly select from songs having a first characteristic (e.g. songs not played in last 14 days). Then, a content item is randomly selected from content pool 110 and is evaluated against the user's selection parameters. The selection parameters may also be applied in combination via Boolean operands (e.g. "and", "or", "nor"). For example, the selection criteria may comprise a genre of "rock" "and" year of "1990-

1999" to select only rock songs from the '90's. If the content item meets one or more evaluation parameters, then the content item is placed in output queue 114. The user's selected criteria for selection process 112 may also be saved so that the user may alter one or more of these criteria for another instance of using selection process 112.

In some embodiments, a non-selected content item may be designated to no longer be a candidate for output queues 114 until the excluding evaluation parameter is changed. This type of blocking is considered a "hard" exclusion. For example, if content pool 110 includes both MP3 and SONY Adaptive Transform Acoustic Coding (ATRAC)-type content item container formats, the user may choose to exclude the ATRAC-type content items from output queues 114 built from this content pool. Other hard exclusions include, for example, content type (e.g., no video content, no music video content, no "podcast"-type (e.g., audio programs published via the Internet) content) and duration (e.g., no songs under or over five minutes). In one instance, content items having an output duration longer than a specified time (e.g., 1500 seconds for a music item—approximately the time of a single side of a 33-⅓ RPM 12-inch music record album) may be excluded from output queue 114. The size of the content item may also be used to form an exclusion, for example, any files over 10 MB may be omitted as a candidate from output queue.

If the content item does not meet the evaluation parameters, the content item may be specified to remain a candidate for later selection and evaluation. This type of blocking is considered "soft" exclusion. In some embodiments, the soft exclusions are based on output queue 114 build options set by the user.

For example, a user may set an option that specifies the minimum output queue distance (e.g. four) between content items created by the same artist. Referring to FIG. 4, selection process 112 places a first content item by artist A in the first position 210 of output queue 114. If selection process 112 randomly selects another artist A content item from content pool 110 for the second through fifth positions 212 in output queue 114, then the selected content item will not be placed in output queue 114. However, if selection process 112 randomly selects a second artist A content item from content pool 110 for the sixth position 214, it would be eligible for placement in that spot of output queue 114. In a similar manner, other embodiments may include setting a minimum queue distance between content items associated with the same genre, album, track (e.g. for embodiments in which a track may be selected multiple times from content pool 110), etc.

One option is to allow more frequent inclusion of certain content items into output queue 114 ("heavy rotation" of content item output). As described above, general options include preventing a content item from being repeated in output queue 114, or specifying a minimum queue distance between content items. At times, however, a user may desire to have one or more content items more frequently output. The heavy rotation option allows a user to specify options such as allowing repeated entries in a single output queue 114 for specific content items, or reducing the artist or album queue distance for specific artists or albums while maintaining a larger queue distance for other content items.

The parameters may also be set so that the probability of desirable content items 104 is increased. For example, particular content items may be specified to be arranged early in output queue 114 (e.g. the more desirable content items may be "front loaded" in output queue 114).

In some embodiments, content items 104 may be assigned an explicit and/or an implicit user preference. The explicit rating is explicitly made by the user (or others) using, e.g., wherein the user assigns a value to the content item on a scale from 1 to 5. As an alternative or in addition to the explicit rating, an implicit rating may be made automatically (e.g., on the scale from 1 to 5) by evaluating behavior of the user (or others), such as evaluating how often a content item is output (either while using an output queue 114, output without using an output queue 114 (e.g., manual selection for output), or a combination of such outputs). Frequently output content items are assumed to be preferred and are assigned a higher number. For example, a default implicit rating of three may be automatically assigned when a content item 104 is imported to the platform 102. This default implicit rating is then automatically modified in accordance with output of the content item's presentation data. In one embodiment, a content item's implicit rating is only used if an explicit rating does not exist.

In some embodiments, the soft or hard exclusions may be applied based on a rating or score value that is calculated for a particular content item. In one embodiment, selected content items having a score larger than a particular value are included in output queue 114. In another embodiment, selected content items having a score smaller than a particular value are excluded from output queue 114. These two exclusion systems are combined in some instances so that a selected content item having a score larger than a first value is placed into output queue 114, a content item having a score smaller than a second value is permanently excluded from output queue, and a content item having a score between the first and the second values remains a candidate for a later selection.

The probability that explicitly or implicitly rated items be selected for inclusion or exclusion in output queue 114 may also be set by the user. For example, selection process 112 may be configured to generate an output queue of having a 50% composition of randomly content items having a "four" rating, a 30% composition of content items having a "five" rating, and a 20% composition of content items having a "thee" rating. These assigned probabilities may also be applied to other criteria such as genre, last played, etc. instead of or in combination to the rating value.

Alternatively, selection process 112 may be configured to include or exclude a selected content item from output queue 114 is made relative to previously selected content item scores. For example, a score or rating for a content item selected from content pool 110 is compared to a specified parameter, e.g. the average score of all previously selected content items. If the selected content item score is higher than the average, then the content item is included in output queue 114. Otherwise the selected content item is returned to output queue 110 as a candidate to be selected at a later time. Alternatively, the score of a selected content item may compared against a running average of scores for recently included (e.g., the last ten) content items.

In one embodiment, the numbers of times content items are output may be stored in memory ("play count"). An implicit rating value, or scoring weight (e.g., in the range 0-20) may be assigned to the play count. If the play count scoring weight is set relatively high (e.g., seventeen), then frequently output content items are favored for inclusion in output queue 114. If the play count scoring weight is set relatively low (e.g., three), then output queue 114 will have a larger variety of frequently and less frequently output content items.

In an alternative embodiment, the numbers of times content items that are transferred (e.g. from platform 102 to device 122) may be stored in memory ("transfer count"). A scoring weight (e.g., 0-20) is assigned to the transfer count. If the transfer count scoring weight is set relatively high (e.g., 18), then content items that are frequently transferred to one or more other devices are favored for inclusion in output queue 114. If the transfer count scoring weight is set relatively low (e.g., 2), then output queue 114 will have a larger variety of frequently and less frequently transferred content items.

In addition, specific content genres may be assigned scoring weights for inclusion into and exclusion from output queue 114. Content genres are subdivisions of forms of expression (e.g., in music, genres may include divisions such as "rock" and "Latin", and in some instances are hierarchical (e.g., "jazz" and particular styles of jazz (delta blues, Chicago blues, Latin jazz, fusion, etc.)).

In one illustrative instance, music genres may be weighted 0-10 for inclusion, with a 0 weight meaning that the inclusion weight is ignored, and with a 10 meaning that the associated genre is always included in output queue 114. Similarly, music genres may be weighted 0-10 for exclusion, with a 0 weight meaning the exclusion weight is ignored and with a 10 meaning that the associated genre is always excluded from output queue 114.

Alternatively, content types may be assigned scoring weights for exclusion. Content types are of a more general nature than genres, which are often but not always subdivisions of content types. Audio types (e.g., music, spoken word, podcast) and video types (e.g., movies, television broadcast program episodes) are examples of content types. In one illustrative instance, audio types are weighted 0-10 for exclusion. An audio type with a 0 weight could be set so that that the exclusion is ignored. Correspondingly, an audio type with a 10 weight means that this audio type will always be excluded.

Selection process 112 may further be configured to select content items 104 for output queue 114 as a function of the date/time the content items were imported. For example, the date and time that content items have been imported 104 to library 106 may be stored in memory ("import date"). A scoring weight (e.g., −10 to +10) may be assigned to the range of import date. In one illustrative instance, a low value import time weight (e.g., −8) will favor including content items into output queue 114 that were imported at relatively earlier dates, whereas a high value import time weight (e.g., +8) will favor including content items that were imported more recently. An import time weight of zero causes import time to be ignored.

In another embodiment, selection process 112 may also be configured to select content items 104 for output queue 114 as a function of the date/time the content items were played from platform 102 or output device 122. Generally, the most recent date/time that a content item is output 116 is stored in memory ("play time"). A scoring weight (e.g., −10 to +10) is assigned to play time scoring. In one illustrative instance, a low value play time weight (e.g., −7) will favor including content items into output queue 114 that have not been output 116 for a relatively long time. In this manner, content items about which the user has forgotten can be favored. In a similar manner, a high value play time weight (e.g., +7) will favor including content items output more recently.

In some embodiments, election process 112 may also be configured to "cluster" selected content items in output queue 114. For example, music content items can be clustered by artist, album, genre, and so forth.

Figure 5:
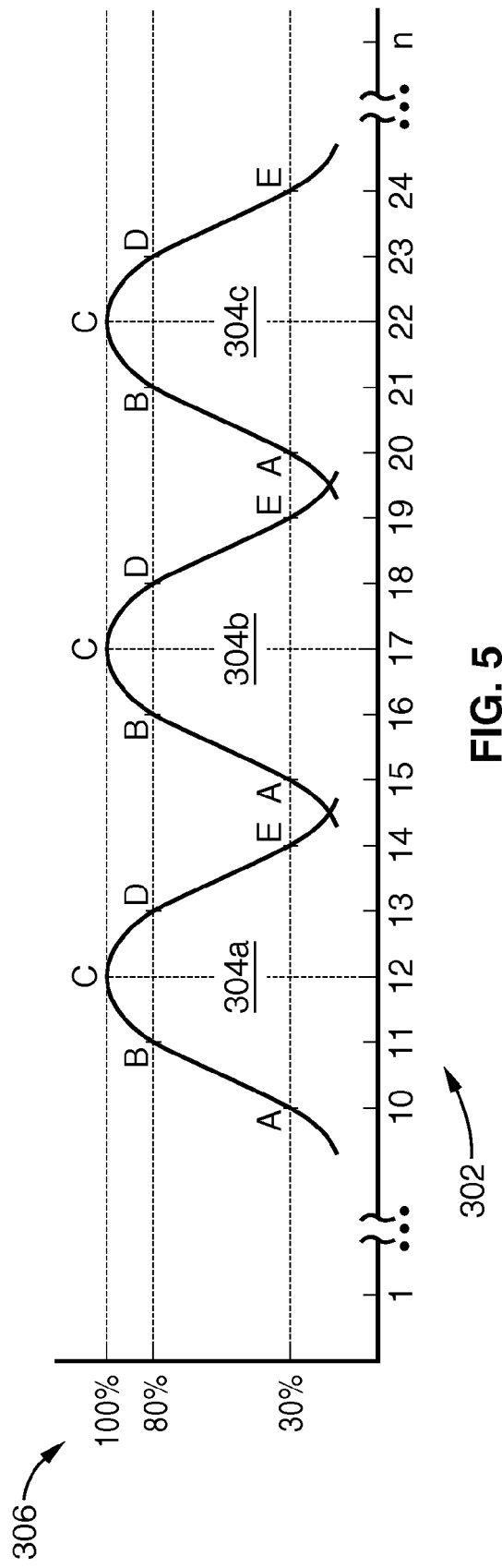
FIG. 5 illustrates a clustering feature for generating an output queue in accordance with the present invention.

FIG. 5 is a diagrammatic view illustrating clustering for output queue 114 in accordance with the present invention. As illustrated in FIG. 5, content item positions 302 (numbered 1 to n) are shown sequentially in output queue 114 along the horizontal axis. In one instance, the clustering feature may be set to a scale, e.g. from 0 to 10, where a "zero" setting means the clustering feature is ignored and a "ten" setting means that content items in output queue 114 will be heavily clustered.

One or more clustering distributions may be applied to the selection process. As shown in FIG. 5, three clustering distributions, 304a, 304b, 304c are shown distributed over various content item positions 302. Clustering probabilities values 306 are shown along the vertical axis, and correspond to various points (A, B, C, and D) in the clustering distributions 304a-304c. In the example illustrated in FIG. 5 and point A is assigned a 30 percent probability, point B is assigned an 80 percent probability, point C is assigned a 100 percent probability, and point D is assigned a 30 percent probability D, and point E is assigned a 30 percent probability. It is appreciated that any number of clusters, points, and probability values may be used.

In the above example, each range of content item positions 302 covered by a clustering distribution is matched with the probabilities for the cluster distribution. For example, in clustering distribution 304a, content item position number 10 is matched with A, number 11 with B, number 12 with C, number 13 with D, and number 14 with E.

In a one embodiment, the output queue may be clustered by artist. For Artist1 may be selected as a seed artist for the first cluster 304a. Seed selection may be done using any of the various selection processes described, including manual selection by the user, or selection based on earlier clustering. For example, the content item with the highest score in a cluster may be used as the seed for the immediately following cluster. Since content item position number 10 in output queue 114 is matched with distribution probability A, the content item selected for position number 10 is made such that there is a 30-percent probability that the selected content item is associated with Artist1. Likewise, the content item selected for position number 11 is 80-percent, for position number 12 is 100-percent (i.e., Artist1 must be selected), for position number 13 is 80-percent, and for position number 14 is 30-percent. Likewise, Artist2 is selected as the seed artist for the second cluster 304b, and Artist2's content items are similarly inserted into output queue 114.

Clustering may also be applied to the selection process 112 for albums and for other classifications such as genres, rating, etc. In this way, the user tends to experience a cluster of related or desired content items. The distribution ranges and probability values described herein are illustrative, and various ranges and probabilities may be selected by the user. Desirable content items may also be clustered near the beginning of output queue 114 so that such items are "front loaded". Such a front loading feature is especially useful for a list 118 to ensure that desired content items are transferred to a device if the device capacity is limited.

In some instances, near the end of selection process 112 a few remaining content items in content pool 110 will fail to meet automated selection criteria for inclusion in output queue 114. In these situations, various options are may be employed for processing, such as not including the remaining content items in output queue 114, ignoring the selection criteria and placing the remaining content items into output queue in a random order, and prompting the user to act on the remaining content items to, e.g., include, exclude, save, or order them in output queue 114. Such remaining content items, if excluded or left until the end, may also be flagged to increase the chance of being included in a subsequent output queue 114.

As described above, content is generally output 116 as output queue 114 is built. In some instances, however, the output 116 of presentation content associated with output queue 114 is stopped. For example, in one instance output is stopped if a source (e.g., drive, connection) that provides a content item in output queue 114 is removed. In another instance the output is stopped if the software client that incorporates selection process 112 is launched by selecting a Uniform Resource Locator (or Uniform Resource Identifier) or by another event that requires the client to immediately begin output of another content item. In yet another instance, the output 116 is stopped if the "shuffle" option in the client is stopped and restarted; the "shuffle" option then beginning anew. And in still another instance, the output 116 is changed if one or more various selection process 112 selection process criteria are changed (i.e., the user decides to change how content output queue 114 is built).

FIGS. 6A-6H and 6J are diagrammatic views that illustrate features associated with output queue 114 and a content pool 110 of n content items. As shown in FIG. 6A, a number of the content items in output queue 114 are displayed in window (or pane) 402. In some embodiments window 402 is a pane (or panel, or frame) in a windowing-type graphical user interface display system. In other embodiments, window 402 represents a full small screen display on, e.g., a portable device such as output device 122. Queue information outside the boundary of window 402 is generally not visible to a viewer without scrolling view the device or platform input.

In FIG. 6A, the titles 404 (illustrated as long horizontal lines) of an exemplary seven content items are shown next to their corresponding output queue position numbers 406. It is appreciated that in some embodiments, the position number 406 may be omitted to free window or display space. As selection process 112 builds output queue 114, the title 404 of each selected content item is placed next to its corresponding position number 406. During content output 116, an output indicator 408 (illustratively shown as a schematic speaker symbol in FIGS. 6A-6H and 6J) may be located next to the queue position number that corresponds to the content item currently being output. As shown in FIG. 6A, the output indicator 408 appears next to the second position number 406 so as to allow a user to see the title of the content item previously output. The titles 404 of the next five content items to be output (queue position nos. 3-7) are shown to allow the user to see ahead in output queue 114, and to modify the selected content item order as described herein. Queue position no. 8, however, has not yet been filled by selection process 112.

FIG. 6B illustrates that output of one content item in output queue has ended output of the next content item has started. Output indicator 408 now appears next to the queue position and title of the content item being output (queue position no. 3). The earlier output content item titles (illustrated by queue position no. 1) disappear from view at the top of window 402, and a new content item title (illustrated by queue position no. 8) appears at the bottom of window 402. The content item in queue position no. 1 remains in output queue 114 even though its title is not displayed. Likewise, the titles of content items in later queue positions (e.g., positions no. 9-n) are not visible, even though selection process 112 has in some instances placed some or all content items from content pool 110 into output queue 114.

In one illustrative embodiment, selection process 112 is configured to place content items into queue positions at a specified number (e.g. the number of items that will fit in window 402) ahead of the queue position of the content item currently being output. As shown in FIG. 6B, selection process 112 may be configured to not yet have filled queue position number 9. Alternatively, selection process 112 fills all queue positions at once, and positions 9-n are simply not output in window 402, but may be viewed by scrolling via input from the user.

FIG. 6C illustrates that output queue 114 may be edited to rearrange the queue positions assigned to a queue by selection process 112. As shown in 6C, the content item in queue position no. 3 is being output. The user views the titles of the next five content items in output queue 114 and decides that the content item in queue position no. 7 should be output next. The user then moves the content item in queue position no. 7 to queue position no. 4, and the content items originally in queue positions no. 4-6 are automatically shifted down to queue positions 5-7, respectively. This rearrangement of content items in output queue 114 may be achieved using standard techniques, such as drag-and-drop using a pointer or selection and movement using a direction button.

FIG. 6D illustrates that output queue 114 may be edited to delete one or more content items assigned to a queue position by selection process 112. As shown in FIG. 6D, the content item in queue position no. 3 is being output. If the user views titles of the next five content items in output queue 114 and decides that the content item in queue position no. 7 should be deleted from output queue 114, the user can delete the content item in queue position no. 7, and the content items in the following output queue positions are automatically moved up one position. This deletion of a content item in output queue 114 may be achieved using standard techniques, such as drag-and-drop using a pointer or selection and deletion using a delete button. In a preferred embodiment, the deletion of a content item does not stop selection process 112, or otherwise alter the output of output queue 114.

FIG. 6E illustrates the end of output queue 114. Selection process 112 has ended (if generated real-time) or where the entire output queue is generated prior to playback, playback of the generated list has ended. Output queue 114 is now complete and can be stored (e.g. the queue information is stored since the content items are already stored in library 106 from which they are accessed for output) for future use to, e.g., review or edit titles in output queue 114, or to once again output the content items in output queue 114.

FIG. 6F illustrates that output of content items in output queue 114 can manually advanced. For example, the content item in queue position no. 3 is being output as shown in FIG. 6B. During output of the content item in queue position no. 3, the user may skip ahead (e.g. before the playback for the content item in position no. 3) so that the content item in queue position no. 4 is output, as shown by output indicator 408 in FIG. 6F. And, the titles 404 shown in window 402 also shift ahead so that, e.g., the title of the content item in queue position no. 9 appears at the bottom of window 402.

FIG. 6G illustrates that output of content items in output queue 114 can be advanced backwards. For example, the content item in queue position no. 3 is being output as shown in FIG. 6B. During output of the content item in queue position no. 3, output is skipped backward so that the content item in queue position number 2 is output (i.e. re-output), as shown by output indicator 408 in FIG. 6G. In one embodiment, content items already in output queue 114 are not removed from the queue. For example, where selection is real-time, the selection process 112 may act to ensure that five content items are positioned in output queue 114 after the content item presently being output, as illustrated by queue positions number 4-8 if the content item at queue position number 3 is being output as shown in FIG. 6B. If content item output is skipped backwards one queue position to queue position number 2, the content items in queue positions number 4-8 remain in the queue such that there are now six content items in output queue 114 following the content item currently being output. Where the entire output queue 114 is generated prior to playback, the advancement of the current content item for playback either forward or backward does not affect the sequence or composition of the queue 114.

FIG. 6H illustrates that content item titles 404 and output queue positions 406 may extend outside of window 402 so that the queue positions and titles can be scrolled through window 402.

FIG. 6J illustrates that a content item can be added to output queue 114. For example, the content item 410 in queue position no. 3 has been added while the presentation data associated with the content item in queue position no. 2 is being output. Content item 410 may be selected from content pool 110, from library 106, or from another source. Selection process 112 continues to build output queue 114, populating queue position nos. 4-n after content item 410 is inserted. In another instance, content item 410 may be inserted between two populated queue positions or after the last queue position. In yet another instance, content item 410 is inserted at a particular desired queue position number (e.g., at queue position number n so that output queue 114 ends with a particular content item). The addition of content item 410 does not stop the action of selection process 112.

The continuous playback of output queue 114 may include removing an item, drive, or connection to any media in the current list, launching the client from a URL, item Explorer link, or other event that requires that the client immediately begin playback of a new item, unselecting the shuffle option and/or reselecting the shuffle option, or changing the criteria on which the library shuffle is based.

Figure 7A:
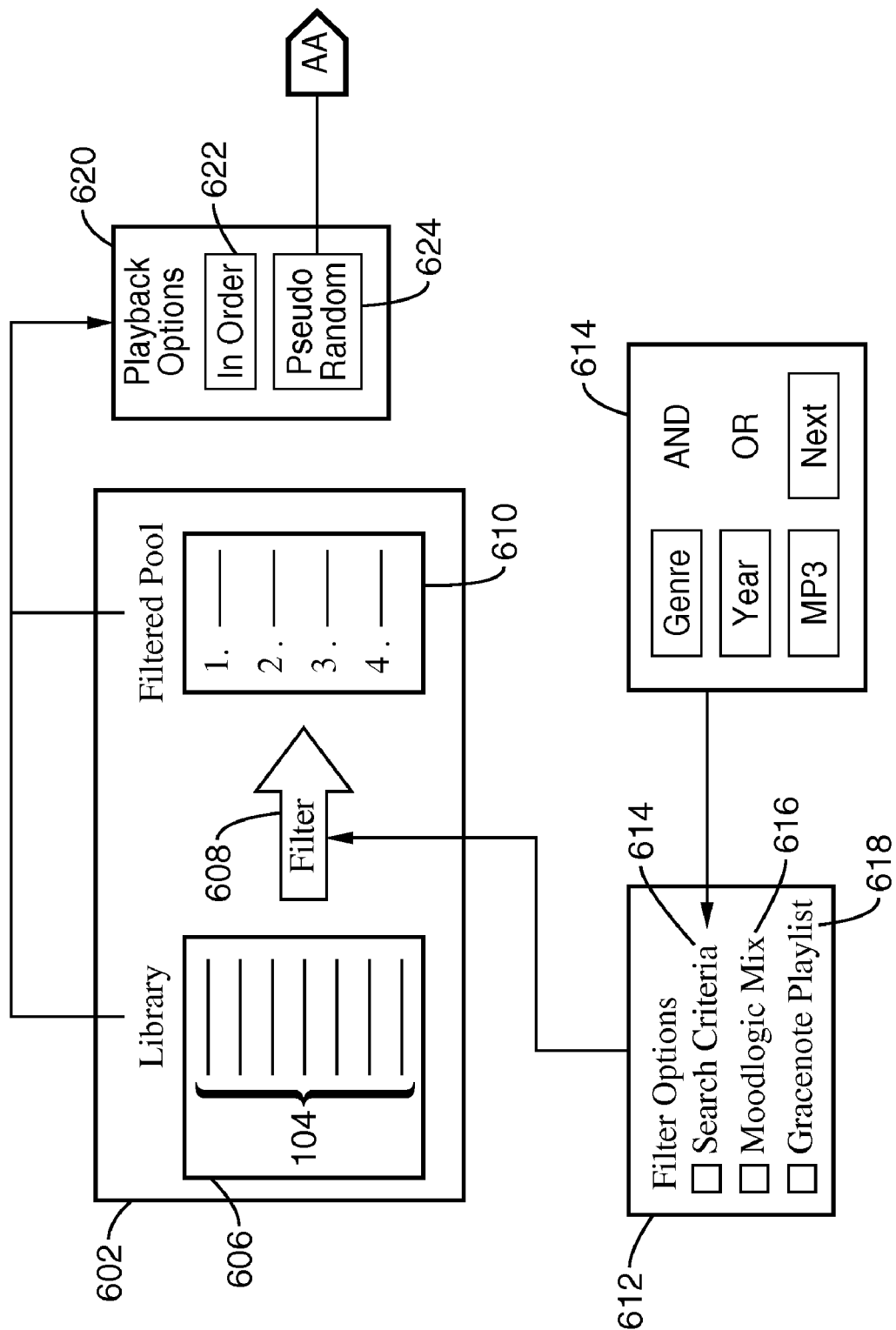
FIGS. 7A-7B illustrate an exemplary user interface for the method of the present invention.
Figure 7B:
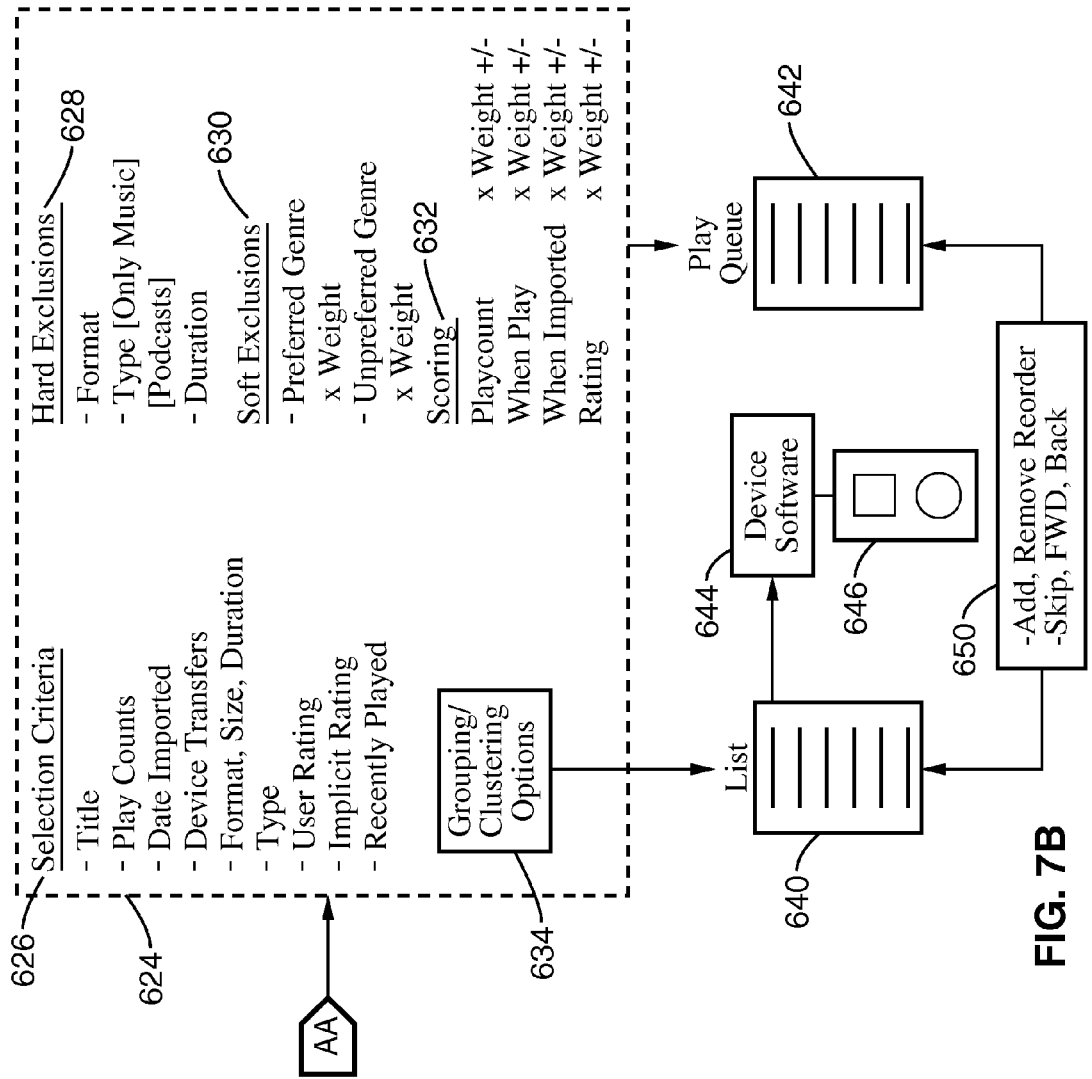

FIGS. 7A and 7B illustrate a user interface for the methods of the present invention. The present invention may incorporate a user interface that includes a number of windows, pull-down menus, etc. For example, window 602 may show a library pane 606 corresponding to library 106 and showing a comprehensible, scroll-down list of library content items 104. A filter option box 608 may also be included and show filter results in filtered items pane 610. A separate filter option pane or window 612 may be included for filter options such as search criteria 614, Moodlogic mix 616, or Gracenote playlist 618. For example, search criteria pane 614 may include options such as genre, year, file type, etc., along with Boolean operands.

The library pane 606 or filtered pool pane 610 may be individually applied as a series of playback options 620, including play back in order as shown in block 622, or pseudorandom playback as shown in block 624. For example, window 624 may detail pseudo random selection criteria 626, hard exclusions 628, soft exclusions 630, scoring 632, and grouping/clustering options 634.

The selection process may generate a further screen or window detailing the play queue 642 or output list 640 which may be output to an external device 646 via device software 644. The device or platform may include a variety of playback commands 650 to either the output queue 642 or list 640.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method comprising:

providing a library having a plurality of library content items;

generating a pool of content items by applying one or more user-selected filtering criteria to the library content items to filter these down into said pool of content items;

accessing metadata associated with one or more content items in said pool of content items;

selecting, randomly or pseudo-randomly, a plurality of playback content items for which the accessed metadata is evaluated and meets a selection criterion;

selecting said content items within multiple clusters of content items in which each said cluster has a characteristic matching one or more specified criteria; and wherein content items in each of said multiple clusters are placed proximal one another within the generated list;

storing content items in a list of selected media content items;

wherein the content items are clustered into one or more clusters of content items by a characteristic selected from the group of characteristics consisting of artist, album and genre; and wherein each of said clusters is defined by probability values, including probabilities of greater than 0 percent and less than 100 percent, distributed across the list positions spanned by the cluster which have a specified probability of the characteristic matching one or more specified criterion.

2. A method as recited in claim 1, further comprising:

selecting an amount of desired clustering to be performed on a scale between a first limit setting in which the clustering feature is ignored and a second limit setting in which the content items are highly clustered.

3. A method as recited in claim 1:

wherein one or more clustering distributions may be applied to the selection process; and wherein the content items are clustered into one or more clusters of content items in response to probability values, including probabilities of greater than 0 percent and less than 100 percent, distributed across the list positions spanned by the cluster to be matched by characteristics of the content item as selected from the group of characteristics consisting of artist, album and genre.

* * * * *